United States Patent [15] 3,641,451

Hollingsworth et al. [45] Feb. 8, 1972

[54] AMPLIFIER PROTECTION CIRCUIT

[72] Inventors: Gale C. Hollingsworth; Ronald V. Steffel, both of Addison, Ill.

[73] Assignee: Motorola, Inc., Franklin Park, Ill.

[22] Filed: Feb. 24, 1970

[21] Appl. No.: 13,475

[52] U.S. Cl. ....................330/134, 325/151, 330/29, 330/139, 330/207 P

[51] Int. Cl. ....................H03g 3/30

[58] Field of Search ....................330/29, 134, 143, 23, 139, 330/207 P; 325/319, 150, 151, 159

[56] References Cited

UNITED STATES PATENTS

| | | | |
|---|---|---|---|
| 3,449,680 | 6/1969 | Schilb et al. | 330/24 X |
| 3,550,029 | 12/1970 | Sunberg | 330/86 |

*Primary Examiner*—Roy Lake
*Assistant Examiner*—James B. Mullins
*Attorney*—Mueller and Aichele

[57] ABSTRACT

A protection circuit for a transmitter amplifier is provided which senses the forward power level and develops a first voltage which is compared with a reference voltage to provide a control voltage which controls the power developed by the transmitter amplifier. Increase in the forward power level is detected changing the control voltage to cause a reduction in the forward power developed by the transmitter amplifier. Decrease in forward power level is detected changing the control voltage to cause an increase in forward power developed by the transmitter amplifier. Reflected power is sensed developing a second voltage which causes a reduction in reference voltage when reflected power exceeds a predetermined level. Reduction of the reference voltage also changes the control voltage to reduce the forward power of the transmitter amplifier to a safe level. An increase in transmitter amplifier temperature beyond a predetermined level is sensed causing a reduction in the reference voltage to change the control voltage thereby reducing the power of the transmitter amplifier to a safe level.

13 Claims, 1 Drawing Figure

Inventors
GALE C. HOLLINGSWORTH
RONALD V. STEFFEL
BY Mueller, Aichele & Rauner
ATTYS.

AMPLIFIER PROTECTION CIRCUIT

BACKGROUND OF THE INVENTION

Amplifier protection circuits currently employed, such as that described in U.S. Pat. No. 3,449,680 issued to Schilb, et. al., provide protection by sensing the current to the final amplifier and reducing the current to a preceding stage with increases in final amplifier current. Such circuits have been used to advantage for a number of years. However, they are not capable of providing protection of the amplifier under all circumstances. It is possible, under certain circumstances, for a transmitter amplifier to be connected to an improper load, such as an open circuit, and still draw the required amount of current. In this case, the amplifier will dissipate both the power developed, called forward power, and the power reflected by the improper load, called reflected power. If the amplifier is not capable of dissipating the combined forward and reflected power it can be seriously damaged before any increase in amplifier current is sensed.

Reflected power detection circuits have been used to detect increases in reflected power, such as when the transmitter amplifier sees an open circuit, and decrease the power of the transmitter amplifier. Although such circuits have also been used to advantage for many years, they do not protect against increases in forward power of the transmitter amplifier due to variations in supply voltage and circuit characteristics, which can cause over dissipation of the transmitter amplifier.

Neither the current sensing protection circuits nor the reflected power protection circuits provide for maintaining the forward power with decrease in supply voltage, or for adjusting the forward power with variations in ambient temperature to maintain a safe power level.

SUMMARY OF THE INVENTION

It is, therefore, an object of this invention to provide a protection circuit for a transmitter amplifier which may be adjusted to maintain a particular forward power level from the transmitter amplifier.

Another object of this invention is to provide a protection circuit for a transmitter amplifier that senses increase in reflected power level and acts to decrease the forward power to a safe level.

Still another object of this invention is to provide a protection circuit for a transmitter amplifier which senses an increase in transmitter amplifier temperature beyond a predetermined level and decreases the forward power to a safe level.

In practicing this invention, a protection circuit is provided for a transmitter amplifier which senses variations in forward and reflected power and variations in amplifier temperature, and maintains the forward power at a safe level. A directional coupler coupled to the line between the transmitter amplifier output and the transmitter antenna senses the forward and reflected power level and develops forward and reflected power sensing signals which vary in accordance with variations in the forward and reflected power level. The forward power sensing signal is coupled to a forward power detection circuit which develops a first voltage that varies in accordance with the forward power level. A bias circuit develops a reference voltage and the first voltage and reference are coupled to a comparison circuit which develops a control voltage that varies in accordance with the difference between the first voltage and the reference voltage. The control voltage is coupled to the transmitter where it is used to bias a stage in the transmitter amplifier, thereby controlling the forward power developed by the amplifier. Increase and decrease in forward power level are detected by the coupler, changing the first voltage, and the difference between the reference voltage and the first voltage. The resulting control voltage changes the forward power developed by the transmitter amplifier to a desired level.

The reflected power sensing signal from the directional coupler is applied to a reflected power detection circuit where it is used to develop a second voltage which varies in accordance with the reflected power level. When the reflected power exceeds a predetermined level, the second voltage causes a reduction in the reference voltage thereby reducing the difference in voltage between the first voltage and the reference voltage. This reduction produces a lower control voltage which causes the forward power developed by the transmitter amplifier to be reduced to a safe level.

A temperature sensing circuit coupled to the reflected power detection circuit senses changes in temperature in the transmitter amplifier. When the temperature exceeds a predetermined level, the temperature sensing circuit will cause a variation in the second voltage which in turn will reduce the reference voltage. The reduced reference voltage will cause the forward power developed by the transmitter amplifier to be reduced to a safe level.

BRIEF DESCRIPTION OF THE DRAWING

The single

DETAILED DESCRIPTION

Figure 1:
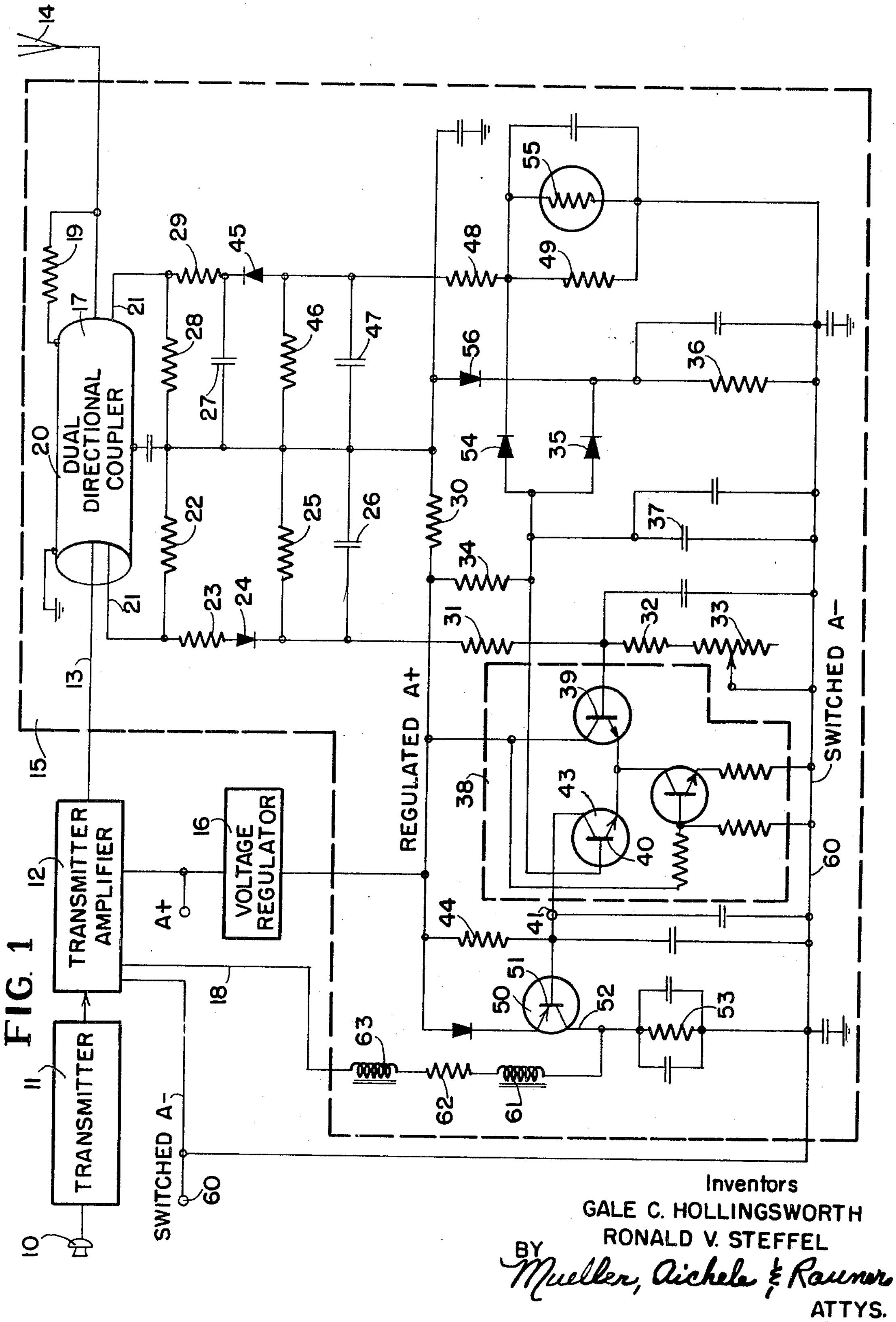
FIGURE 1 is a combined schematic and block diagram of a radio transmitter and a transmitter amplifier protection circuit incorporating the features of this invention.

Referring to FIG. 1, audio signals received at microphone 10 are coupled to transmitter 11 where they are processed in a manner well known in the art to become frequency modulated radio frequency (RF) signals. The frequency modulated RF-signals are coupled to transmitter amplifier 12 where they are amplified to the desired RF-power level, and coupled through conductor 13 to antenna 14. Antenna 14 radiates the RF-signal so that it can be picked up by desired receivers.

The RF-power developed by transmitter amplifier 12 and coupled to antenna 14 is commonly termed "forward power." As transmitter amplifier 12 and antenna 14 are not electrically ideal elements, part the forward power coupled to antenna 14 will be reflected back to amplifier 12. If antenna 14 should accidentally be broken or short circuited, all of the RF-power developed by amplifier 12 will be coupled from antenna 14 back to amplifier 12. The RF-signal reflected from the antenna 14 back to amplifier 12 is commonly termed "reflected power." Resistor 19, coupled from conductor 13 to ground is a static discharge resistor used to discharge the static electricity developed on antenna 19 as it travels through the air.

Forward power developed by amplifier 12 and reflected power coupled back to amplifier 12 both appear on conductor 13, and are coupled through directional coupler 20 in protection circuit 15. Directional coupler 20 is a dual directional coupler which senses both forward and reflected power. It consists of a coaxial conductor having an outer shield 17, center conductor, 13, and a sensing conductor 21. Sensing conductor 21, in parallel with center conductor 13 between center conductor 13 and shield 17, is capacitively and inductively coupled to center conductor 13. The forward power conducted by conductor 13 induces a current in conductor 21 of coupler 20 which varies in relation to the amplitude of the forward power. The current induced in conductor 21 causes a forward power sensing voltage to be developed across resistor 22 which varies in accordance with the forward power level. The forward power sensing voltage is coupled through resistor 23 to diode 24 where it is half-wave rectified and then filtered by resistor 25 and capacitor 26 to produce a forward power voltage across capacitor 26 which varies in accordance with the forward power level. Resistors 30, 25, 31, 32 and potentiometer 33, coupled between voltage regulator 16 (regulated A+) and switched A− (terminal 60) form a bias circuit which develops an adjustable bias voltage at the junction of diode 24 and resistor 25. The unmarked capacitor in parallel with resistor 32 and potentiometer 33 is an RF bypass capacitor as are all the unmarked capacitors in protection circuit 15. The forward power voltage adds to this bias voltage developing a first voltage. The first voltage is coupled through resistor 31 to base 39 of differential amplifier 38.

Resistor 34, diode 35, resistor 36 and capacitor 37, coupled between voltage regulator 16 and switched A− (terminal 60), form a bias circuit which develops a reference voltage at the junction of resistor 34 and diode 35. The reference voltage is coupled to base 40 of differential amplifier 38.

When transmitter amplifier 12 is developing the desired forward power, potentiometer 33 is adjusted such that the reference voltage coupled to base 40 is greater than the first voltage coupled to base 39 by a predetermined amount. The voltage difference between base 40 and 39 will forward bias transistor 43 in differential amplifier 38 allowing current to flow from voltage regulator 16 (regulated A+), through resistor 44, and transistor 43. The current through resistor 44 develops a bias voltage at the junction of resistor 44 and base 51 of transistor 50. The amount of current flow through resistor 44 and transistor 43, and the bias voltage at the base 51 of transistor 50, is proportional to the difference between the voltage at base 39 and base 40 of differential amplifier 38. As the voltage difference increases, the current and bias voltage increase, and as the voltage difference decreases, the current and bias voltage decrease. The bias voltage developed across resistor 44 and applied to the base 51 of transistor 50 forward biases transistor 50. With transistor 50 forward biased, current will flow from terminal 60 (switched A−) through resistor 53 and transistor 50 to voltage regulator 16, developing a control voltage at collector 52 of transistor 50. The amount of current flow and control voltage will be proportional to the bias voltage supplied at base 51, and is therefore proportional to the difference in the voltage between base 39 and base 40 of differential amplifier 38. That is, as the difference in voltage between base 39 and base 40 of differential amplifier 38 increases, the control voltage developed at collector 52 will increase. As the difference in voltage between base 39 and base 40 of differential amplifier 38 decreases, the control voltage developed at collector 52 of transistor 50 will decrease. The control voltage developed at collector 52 of transistor 50 is coupled through RF-choke 61, resistor 62, and RF-choke 63, to conductor 18 where it is coupled to transmitter amplifier 12. The control voltage provides bias for a stage in transmitter amplifier 12 which controls the power developed by the amplifier. An increase in the control voltage will cause an increase in the forward power developed by transmitter amplifier 12, and a decrease in the control voltage will cause a decrease in the forward power. Potentiometer 33 sets the voltage applied to base 39 of differential amplifier 38 to thereby adjust the difference in voltage between base 39 and base 40 such that a control voltage is developed which maintains the power developed by transmitter amplifier 12 at the desired level.

If the forward power developed by transmitter amplifier 12 should increase, as for example due to an increase in supply voltage, the first voltage developed at base 39 of differential amplifier 38 will increase, decreasing the voltage difference between base 39 and base 40. This decrease in voltage difference causes a decrease in control voltage. The reduced control voltage when coupled to transmitter amplifier 12 will cause a reduction in the forward power developed by transmitter amplifier 12.

If the forward power developed by transmitter amplifier 12 should decrease, as for example due to an decrease in supply voltage, the first voltage developed at base 39 of differential amplifier 38 will decrease, increasing the voltage difference between base 39 and base 40 of differential amplifier 38. This increased voltage difference will cause an increase in control voltage. The increased control voltage when coupled to transmitter amplifier 12 will cause an increase in the forward power developed by transmitter amplifier 12.

When transmitter amplifier 12 is energized by the application of switched A− voltage, care must be taken to prevent maximum control voltage from being applied thereto before protection circuit 15 has stabilized. The switched A− applied to transmitter amplifier 12 to energize the amplifier is also applied to protection circuit 15 from terminal 60, to energize protection circuit 15. The switched A− causes capacitor 37 in the reference voltage bias circuit to slowly charge, causing the reference voltage coupled to base 40 of differential amplifier 38 to gradually increase. This causes the control voltage coupled to transmitter amplifier 12 to gradually increase, slowly increasing the power developed by transistor amplifier 12 until full power is developed. The time required for transmitter amplifier 12 to achieve full power is sufficient to allow protection circuit 15 to stabilize.

Reflected power coupled from antenna 14 by conductor 13 to transmitter amplifier 12 is sensed by directional coupler 20 inducing a current in conductor 21 which varies in relation to the amplitude of the reflected power. The induced current causes a reflected power sensing voltage to be developed across resistor 28. The reflected power sensing voltage is coupled through a low-pass filter consisting of resistor 29 and capacitor 27, which compensates for variations in sensitivity of directional coupler 20 at different frequencies, to diode 45 where it is half-wave rectified. Resistor 46 and capacitor 47 filter the rectified signal to develop a reflected power voltage across capacitor 47 which varies in accordance with the reflected power level. The reflected power voltage is negative in sign and will subtract from a bias voltage developed at the junction of diode 45 and resistor 46 to develop a second voltage. Resistor 30, 46, 48 and 49, coupled between voltage regulator 16 and switched A− (terminal 60), form the bias circuit which develops the bias voltage at the junction of diode and resistor 46. The second voltage is coupled through resistor 48 to diode 54. Diode 54 constitutes one half of a diode or gate consisting of diode 35 and diode 54.

With little or no reflected power sensed by directional coupler 20, the second voltage coupled to the junction of resistor 48 and diode 54 will be greater than the bias voltage developed at the junction of diode 35 and resistor 36. Diode 35 will be forward biased and 54 reversed biased. As the reflected power detected by directional coupler 20 increases, the second voltage at the junction of resistor 48 and diode 54 will decrease due to the negative reflected power voltage. When the reflected power exceeds a predetermined level, the second voltage at the junction of resistor 48 and diode 54 will become less than the bias at the junction of diode 35 and resistor 36, causing diode 54 to conduct, and reverse biasing diode 35. As the reflected power increases further, the second voltage at the junction of resistors 48 and diode 54 will decrease further causing more current to flow through diode 54. The current flow through resistor 34 due to the conduction of diode 54 will reduce the reference voltage applied to base 40 of differential amplifier 38, decreasing the difference in voltage between base 39 and base 40 of differential amplifier 38. This decrease in voltage difference causes a decrease in the control voltage developed at collector 52 of transistor 50. The reduced control voltage when coupled to transmitter amplifier 12, by conductor 18, will cause a reduction in the forward power developed by transmitter amplifier 12, thereby preventing excessive power dissipation in amplifier 12 due to the increased reflected power. In the preferred embodiment a reflected power level equal to 11 percent of the desired power level will cause a reduction in the forward power developed by transmitter amplifier 12.

Increases in ambient temperature of amplifier 12 reduce its ability to withstand increased dissipation due to excessive forward or reflected power. To prevent damage to transmitter amplifier 12 when the ambient temperature rises, a temperature sensing circuit is added to amplifier protection circuit 15. Thermistor 55, coupled in parallel with resistor 49 is physically located adjacent to amplifier 12. As the ambient temperature of amplifier 12 increases, the resistance of thermistor 55 decreases causing the resistance of the parallel combination of resistor 49 and thermistor 55 to decrease. The decreased resistance decreases the bias voltage developed at the junction of diode 45 and resistor 46. With a lower bias voltage developed at the junction of diode 45 and resistor 46, a lower reflected power voltage will be required to develop a second voltage which will forward bias diode 54, and cause the reference voltage at base 40 of differential amplifier 38 to decrease. A lower reflected power will therefore be required to cause a reduction in the forward power developed by transmitter amplifier 12.

If the ambient temperature of amplifier 12 increases beyond a predetermined level, the second voltage will decrease, due to the decrease in bias voltage, to a level which will forward bias diode 54 with no reflected power present. The resulting decrease in reference voltage will decrease the forward power developed by amplifier 12. This prevents the desired forward power from damaging amplifier 12 when it is required to operate at an extremely high ambient temperature.

In the preferred embodiment, the temperature at which diode 54 will conduct with little or no reflected power present is 80° C. This temperature can be selected at any desired value.

Diodes 35 and 54 are necessary to control the reflected power level and temperature level at which the forward power is reduced. Variations in temperature will, however, cause the current and voltage characteristics of these diodes to vary thereby changing the reflected power level and temperature level necessary to reduce the forward power. Diode 56, coupled from the junction of resistor 30 and capacitor 26 to the junction of diode 35 and resistor 36, provides temperature compensation for diodes 35 and 54, thereby preventing changes in temperature from affecting the reflected power level and temperature level necessary to reduce the forward power of transmitter amplifier 12.

As can be seen, amplifier protection circuit has been provided which maintains the forward power developed by a transmitter amplifier at a predetermined level. The protection circuit further senses increases in reflected power and decreases the forward power of the transmitter amplifier to prevent excessive dissipation due to the combination of forward and reflected power. Changes in ambient temperature of the transmitter amplifier which decrease the dissipation capability of the amplifier are sensed and used to reduce the amount of reflected power necessary to reduce he forward power of the transmitter amplifier.

We claim:

1. A protection circuit for controlling the power of a transmitter amplifier which produces an output varying with a control signal applied thereto, such circuit including in combination, first circuit means coupled to the transmitter amplifier output for sensing the forward power coupled therefrom, said first circuit means developing a first signal which varies in accordance with said forward power and a second reference signal, signal comparing means coupled to said first circuit means for comparing said first and second signals, said signal comparing means developing a control signal which varies in accordance with the difference between said first and second signals, said signal comparing means being coupled to the transmitter amplifier and applying said control signal thereto to vary the power developed by the transmitter amplifier, and temperature sensing means coupled to said first circuit means and responsive to the temperature of said transmitter amplifier, said temperature sensing means causing said second reference signal to vary in accordance with said temperature.

2. The protection circuit of claim 1 wherein said temperature sensing means includes thermal resistance means which varies in response to temperature variations.

3. The protection circuit of claim 2 wherein said thermal resistance means is a thermistor.

4. The protection circuit of claim 1 wherein said signal comparing means includes differential amplifier means coupled to said first circuit means, said differential amplifier means responsive to the difference between said first and second signals to develop a third signal, said third signal varying in relation to the difference between said first and second signals, and amplifier means coupled to said differential amplifier means for amplifying said third signal to develop said control signal.

5. The protection circuit of claim 1 wherein said first circuit means includes directional coupler means for sensing said forward power and the reflected power to the transmitter amplifier output, said coupler means developing forward and reflected power sensing signals which vary respectively in accordance with said forward power and said reflected power, forward power circuit means coupled to said coupler means, said forward power circuit means being responsive to said forward power sensing signal to develop said first signal, and reflected power circuit means coupled to said coupler means, said reflected power circuit means being responsive to variations in said reflected power sensing signal to vary said second reference signal.

6. The protection circuit of claim 5 wherein said directional coupler means is a dual directional coupler.

7. The protection circuit of claim 5 wherein said forward power circuit means includes, rectifier means coupled to said coupler means and filter means coupled to said rectifier means for rectifying and filtering said forward power sensing signals to develop a forward power voltage which varies in accordance with said forward power, bias circuit means for developing a bias voltage coupled to said rectifier means and filter means, and means coupling said forward power voltage to said bias circuit means to vary said bias voltage to develop said first signal.

8. The protection circuit of claim 5 wherein said reflected power circuit means includes, first bias circuit means coupled to said signal comparing means for developing said second signal, second circuit means coupled to said directional coupler means and first bias circuit means, said second circuit means responsive to said reflected power sensing signal to develop a reflected power voltage which varies in accordance with said reflected power, said first bias circuit means responsive to variations in said reflected power voltage to vary said second signal.

9. The protection circuit of claim 8 wherein said second circuit means includes, rectifier means coupled to said directional coupler means and filter means coupled to said rectifier means for rectifying and filtering said reflected power sensing signal to develop a second circuit voltage which varies in accordance with said reflected power, bias circuit means for developing a bias voltage coupled to said rectifier means and filter means, and means coupling said second circuit voltage to said bias circuit means to vary said bias voltage to develop said reflected power voltage.

10. A protection circuit for a transmitter amplifier which produces an output which varies with a control signal applied thereto and operating when a supply voltage is applied thereto, said circuit including in combination, sensing means coupled to the output of the transmitter amplifier, said sensing means being responsive to the forward power coupled therefrom to develop a forward power signal which varies in relation to said forward power, said sensing means further being responsive to the reflected power coupled to the transmitter amplifier to develop a reflected power signal which varies in relation to said reflected power, first circuit means coupled to said sensing means and responsive to said forward power signal to develop a first signal which varies in relation to said forward power, bias circuit means for developing a reference signal, signal comparing means coupled to said first circuit means and to said bias circuit means, said signal comparing means being responsive to said reference signal and to said first signal to develop a control signal which varies in accordance with the difference between said reference signal and said first signal, means coupling said signal comparing means to the transmitter amplifier and applying said control signal thereto to control the power developed by said transmitter amplifier, and temperature sensing means coupled to said bias circuit means, said temperature sensing means sensing the temperature of said transmitter amplifier and having a characteristic varying in accordance with said temperature, said bias circuit means being responsive to said temperature sensing means variations to vary said reference signal whereby the difference between said first signal and said reference signal changes.

11. The protection circuit of claim 10, further including, second circuit means coupled to said sensing means, said second circuit means responsive to said reflected power signal to develop a second signal which varies in relation to said reflected power, said second circuit means coupled to said bias circuit means, said bias circuit means responsive to said second signal which reaches a predetermined value to vary said reference signal whereby the difference between said first signal and said reference signal changes.

12. The protection circuit of claim 10 further including, means coupled to said bias circuit means for delaying development of said reference signal upon application of the supply voltage.

13. The protection circuit of claim 12 wherein said means is a capacitive reactance.

* * * * *